United States Patent [19]

Tanaka et al.

[11] 4,154,910

[45] May 15, 1979

[54] METHOD FOR PRODUCING ACRYLAMIDE POLYMERS

[75] Inventors: Katsutoshi Tanaka, Chigasaki; Kazuo Ikeda, Kanagawa, both of Japan

[73] Assignees: Kyoritsu Yuki Co., Ltd.; Mitsubishi Chemical Industries, Ltd., both of Tokyo, Japan

[21] Appl. No.: 795,522

[22] Filed: May 10, 1977

[30] Foreign Application Priority Data

May 14, 1976 [JP] Japan .................................. 51-54302

[51] Int. Cl.$^2$ ................................................ C08J 9/28
[52] U.S. Cl. ................................ 521/63; 260/29.6 R; 521/149; 526/292; 526/303
[58] Field of Search ............................ 526/303, 292; 260/2.5 R, 29.6 R; 521/63, 149

[56] References Cited

U.S. PATENT DOCUMENTS

| | | | |
|---|---|---|---|
| 3,753,962 | 8/1973 | Restaino | 526/303 |
| 3,772,257 | 11/1973 | Bochum et al. | 526/61 |
| 3,951,934 | 4/1976 | Ohshima et al. | 526/303 |
| 3,975,341 | 8/1976 | Trapasso | 526/303 |

*Primary Examiner*—Harry Wong, Jr.
*Attorney, Agent, or Firm*—Oblon, Fisher, Spivak, McClelland & Maier

[57] ABSTRACT

Concentrated aqueous solution of acrylamide or mixture of acrylamide and other vinyl monomer is polymerized in the presence of catalyst, and the polymerization solution is to be boiled by heat of polymerization in the course of polymerization.

Obtained hydrous gels of acrylamide polymers are porous, water soluble and are easily dehydrated by conventional dehydration techniques.

5 Claims, No Drawings

METHOD FOR PRODUCING ACRYLAMIDE POLYMERS

BACKGROUND OF THE INVENTION

This invention relates to a method of producing acrylamide polymers, more specifically, this invention relates to an improved method for polymerizing concentrated aqueous monomer solution. Obtained acrylamide polymers are water soluble, porous, hydrous gel and can be dried quickly.

Various processes for preparing polymers of acrylamide have been already known in the art, and many products of acrylamide polymers are now available on the market. The techniques on production of such material are also rapidly advancing. The commercially feasible acrylamide polymers may be grouped into two types: aqueous liquid and powder. These two types of polymers have their own traits, and both of them are widely used in many fields of industry. Recently, however, preference is being given to use of the powder as it has now become possible to obtain the powder with very high quality and also because such powder are more easy to treat.

Various kinds of techniques have been proposed for producing powdery acrylamide polymers, for instance, reversed phase emulsion polymerization method, reversed phase suspension polymerization method and precipitation polymerization method. Any of these methods, however, must use an organic solvent in the polymerization process and also can not always produce a polymer with high quality. There is also available a method in which an aqueous monomer solution at a relatively low concentration (15 to 20% by weight) and dehydration is made by using a water-absorbing solvent such as methanol, acetone or acetonitrile. According to this method, however, a great quantity of water-absorbing solvent must be used as water exists in an amount of more than 5 times the polymer, and also too much cost is required for recovery of the solvent.

Japanese Patent Laid-Open No. 124188/74 discloses "A method of producing dry acrylamide polymers" according to which 10 to 30% by weight of aqueous acrylamide solution is polymerized, and the obtained polymerization product is kneaded and shaped by using an extruder, followed by primary drying with hot air and secondary drying with methanol. This method requires a great quantity of heat as the initial water content is high.

According to the "Method of producing water-soluble polymers" proposed in Japanese Patent Publication No. 5222/74, high-concentration solution of acrylamide (50 to 80% by weight) is polymerized in the presence of a polymerization regulator by forming the polymerization solution into the form of a thin film to increase the surface area while removing heat of polymerization by means of radiation or external cooling. This method has a drawback that the polymerization vessel used therefor is excessively large in area because the polymerization solution is formed into a film, and hence such method is also not suited for industrial application.

In the past attempts for improvement in polymerization of acrylamide, priority has been given to the techniques for removing heat of polymerization and various methods have been proposed in this connection. For instance, in the reversed phase emulsion polymerization method or reversed phase suspension polymerization method, it is tried to dissipate heat of polymerization in a great amount of organic solvent introduced into the polymerization system. In the case of aqueous solution polymerization, as it is difficult to remove heat of polymerization, the monomer concentration usable in this method is up to about 30% by weight, and for polymerization at a higher concentration, the polymerization solution must be formed into a film, so as to expedite heat dissipation. Thus, the greatest problem in the conventional art of aqueous solution polymerization was how to keep the polymerization system below the boiling point to prevent the thermal degradation of the polymer.

SUMMARY OF THE INVENTION

It has now been discovered, in accordance with the present invention, that by boiling the monomer solution with heat of reaction in the course of polymerization, hydrous gels of porous acrylamide polymers are obtained without deterioration of polymer quality. Thus the present invention is to provide a method of producing acrylamide polymers which is economical and industrial available.

This object is attained by a method for producing acrylamide polymers which comprises polymerizing an aqueous solution of monomeric acrylamide with or without other vinyl monomers in a concentration of 30 to 70% by weight based on the solution in the presence of polymerization initiator, and subjecting the polymerization mixtures to boiling with heat of polymerization in the course of polymerization. Basically, this invention is characterized by boiling the polymerization system during the polymerization process, without external heating, and by that heat of polymerization is easily dissipated as heat of evaporation.

DETAILED DESCRIPTION OF THE INVENTION

The present invention is now described in further detail. The monomer or monomers used in this invention may be acrylamide or a mixture of acrylamide and up to 50 mole % of vinyl monomers. Such vinyl monomers may be of any type which is copolymerizable with acrylamide, for example, methacrylamide, N-substituted (metha)acrylamide, N,N-substituted (metha)acrylamide, (metha)acrylonitrile, (metha)acrylic acid, salt of (metha)acrylic acid, methyl (metha)acrylate, ethyl (metha)acrylate, butyl (metha)acylate, dimethylaminoethyl (metha)acrylate, various salts and quaternary ammonium salt of dimethylaminoethyl (metha)acrylate, diethylaminoethyl (metha)acrylate, various salts and quaternary ammonium salt of diethylaminoethyl (metha)acrylate, styrene, styrene derivatives, vinylpyridine and various salts thereof, vinylpyrrolidone and vinyl acetate.

The monomer concentration is selected within the range of 30 to 70% by weight in this invention. It is possible to obtain porous polymer gel by polymerization of monomer concentration of less than 30% by weight, if the polymerization starts at higher temperature. But low polymer concentration results in an economical disadvantage when drying the obtained polymer gel. This goes against the object of this invention to obtain an economically advantageous acrylamide polymer in a powdery form. Also, in case of practicing the reaction of obtained polymer such as Mannich reaction in a salt solution for example, low polymer concentration necessitates large amount of the salt solution, resulting in elevated cost for recovery of the solution.

On the other hand, if the monomer concentration is over 70%, amount of water is insufficient to remove heat of polymerization, temperature of the polymerization system is increased to result undesirable reaction such as imidation reaction and the product substantially insoluble in water.

The polymerization steps of the present invention is carried out under conditions used in the art except the control of the polymerization temperature.

The polymerization starts by adding a polymerization initiator to an aqueous monomer solution at a temperature sufficient to initiate polymerization.

As to the polymerization initiator any known type of polymerization catalyst can be used.

Illustrative of these catalysts are tertiarybutylhydroperoxide, ditertiarybutylperoxide, benzoyl peroxide, hydrogen peroxide, ammonium persulfate, potassium persulfate, sodium persulfate, sodium chlorate, potassium chlorate, ammonium chlorate, sodium perborate, and the like. As a redox system one may use such catalyst comprising an oxygen containing compound and a reducing agent such as the combination of sodium persulfate with potassium bisulfite, sodium persulfate with sodium bisulfite, potassium persulfate with potassium bisulfite, ammonium persulfate with sodium thiosulfate and the like. When higher molecular weight polymers are desired a combination of an alkali metal bromate and an alkali metal sulfite or an alkali persulfate with a tertiary amine can be used. These latter catalyst combinations are described in the U.S. Pat. No. 3,002,960. As a azo catalyst 2,2'-azobis(2-amidinopropane)hydrochloride, 2,2'-azobis(2,4-dimethylvaleronitrile), 2,2'-azobis-(isobutyronitrile), 2,2'-azobis(4-methoxy-2,4-dimethylvaleronitrile) can be used.

As a general rule, the catalyst will be used in conventional catalyst amount such as between about 0.001% and 5% by weight based on the weight of the dry monomer.

Preferred catalyst are a redox type initiator, a water-soluble azo compound or a combination thereof, or a combination of a reducing agent and a water-soluble or oil-soluble azo compound. If needed, it is also possible to use a chain transfer agent.

There is no need of forming the polymerization solution into a film as in the method described in Japanese Pat. Pub. No. 5222/74. For instance, polymerization may be performed on an endless belt by providing means for preventing side stream or after-stream and feeding a high-concentration aqueous monomer solution so that such solution is formed with a thickness of 200 to 300 mm on said belt, or in some cases, polymerization may be carried out in a tank with the horizontal bottom by feeding a high-concentration aqueous solution in 500 mm height. It is however advisable to avoid too much enlargement of the distance from the vessel bottom to the surface of the solution therein, because it is not expedient to escape the vapors produced and it is dangerous because of increasing the pressure in the vessel. The preferred form of the polymerization vessel used in this invention is the one which spreads out gradually upwardly and is lined internally with polyester or polycarbonate, and which can be turned 180 degrees for taking out the produced polymer gel by letting it drop naturally.

The reaction system is purged with $N_2$ or $CO_2$ or other innert gas before the addition of the polymerization catalyst. After starting the polymerization the temperature of the polymerization system rises gradually to the boiling point of the system. Generally, it takes about 5 to 20 minutes from the start to boiling and boiling state continues for about 1 to 5 minutes, though these times are different from the polymerization conditions, such as catalyst used, amount thereof, monomer concentration, and starting temperature.

The temperature of the polymerization system falls slowly after boiling, but the polymerization is carried out until substantially all of the monomer is converted to polymer by leaving the reaction system as it is for about 3 hours or more.

The resulted polymerization mixtures are hydrous gel of acrylamide polymers which is porous, and water content is reduced by evaporation of water, in other word, the solution is thickened.

The polymer content in the hydrous gel is comparatively high, the gel can be dried quickly. Known drying techniques are used to remove the water from the polymer gel.

The molecular weight may be varied over a wide range and may be low as a few thousand such as 20,000 to 50,000 or may be exceedingly high in molecular weight such as 2 million, 10 million and even higher. The method for determining the molecular weight can be achieved by any one of known techniques such as viscosities.

Now, the method of this invention is described in further detail by way of some preferred embodiments thereof, but the present invention is not limited to these examples.

EXAMPLE 1

4 kg of acrylamide was dissolved in 6 kg of deionized water and this solution was put into a 15-liter stainless steel polymerization vessel. The temperature in the system is maintained at 20° C. The thickness of the solution in the vessel, that is the distance from the vessel bottom to the surface of the solution was about 150 mm. Nitrogen gas was passed into this system to remove dissolved oxygen, and when the dissolved oxygen concentration in the system became 0.3 ppm, 0.4 gr of ammonium persulfate and 0.2 gr of sodium bisulfite were added to the system.

Polymerization started immediately and bumping occurred 15 minutes thereafter to release a volume of water vapor. The system temperature elevated up to 110° C., then 2 or 3 minutes later, release of water vapor ceased and the temperature of the polymerization system began to drop slowly. The resultant polymer gel had a plurality of pores in its inside. A part of this gel was collected and the polymer content was measured. It was found that said content was increased to 43% by weight. This polymer gel was perfectly soluble in water and viscosity of the polymer at 1% concentration in 1N sodium chloride solution with Brookfield viscometer was 380 cp (at 25° C.). The residual monomer content was 0.18% by gas chromatography, after the polymer gel was contacted with an 80% aqueous methanol solution for 24 hours.

EXAMPLE 2

2 kg of acrylamide and 1 kg of 2-methacryloyloxytrimethylammonium chloride were dissolved in 5 kg of deionized water and the solution was fed into a 15-liter stainless steel polymerization vessel by maintaining the inner temperature at 30° C. Then nitrogen gas was passed into this vessel to remove dissolved oxygen, and when the dissolved oxygen concentration in the solution became 0.2 ppm, 2 gr of 2,2'-azobis(2-amidinopropane) hydrochloride and 0.2 gr of sodium bisulfite were added. Polymerization started immediately and bumping occurred 15 minutes later to release a great volume of water vapor. The boiling state lasted for about 2 minutes, and then the temperature of the polymerization system began to drop slowly.

4 hours after the start of polymerization, a part of the produced polymer gel was dehydrated by contacting with acetone in a domestic mixer, and granular copolymer of acrylamide and 2-methacryloyloxytrimethylammonium chloride were obtained.

This granular polymer was soluble in water and the viscosity thereof, at 1% concentration in a 1N sodium chloride solution with Brookfield viscometer was 85 cp (measured at 25° C.).

EXAMPLE 3

1 kg of acrylamide and 0.5 kg of N-N-dimethylacrylamide were dissolved in 1.5 kg of deionized water and this solution was put into a 5-liter stainless steel beaker while keeping the temperature in the system at 20° C. Then nitrogen gas was passed into this system to remove dissolved oxygen, and when the dissolved oxygen concentration in the system became 0.3 ppm, 0.1 gr of potassium persulfate and 0.05 gr of sodium bisulfite were added to the system. Polymerization started 15 seconds later, and bumping occurred 20 minutes later to release a great volume of water vapor.

24 hours later, the produced porous polymer gel was taken out and granulated into the grain size of about 3 mm by a meat chopper and then dried with hot air at 60° C. After drying, the granular material was pulverized by a powdering machine to obtain a powdery copolymer of acrylamide and N,N-dimethylacrylamide.

This powder was soluble in water and its viscosity, measured in the same condition as Example 1, was 340 cp (measured at 25° C.).

EXAMPLE 4

1 kg of acrylamide, 0.5 kg of N,N-dimethylacrylamide and 0.2 kg of diethylaminoethylmethacrylate hydrochloride were dissolved in 1.5 kg of deionized water and resulted solution was put into a 5-liter stainless steel beaker while maintaining the temperature in the system at 20° C. Then nitrogen gas was passed into this system to remove dissolved oxygen, and when the dissolved oxygen concentration in the system became 0.3 ppm, 0.1 gr of potassium persulfate and 0.1 gr of sodium bisulfite were added. Polymerization started about 30 seconds thereafter and bumping occurred about 30 minutes later to release a great quantity of vapor.

24 hours thereafter, the resulted porous polymer gel was taken out and dehydrated by contacting with acetone in a domestic mixer under agitation, and a granular terpolymer of acrylamide, N,N-dimethylacrylamide and diethylaminoethylmethacrylate hydrochloride was obtained.

This polymer was soluble in water and suited for use as a cationic high polymer flocculant. This viscosity of the polymer, measured in the same condition as in Example 1 was 108 cp (measured at 25° C.).

EXAMPLE 5

A solution of 100 kg of acrylamide in 150 kg of deionized water and maintained at 20° C., was placed in a 300-liter stainless steel conical tank, and nitrogen gas was passed into this tank to remove dissolved oxygen. When the dissolved oxygen concentration in the polymerization system became 0.3 ppm, 10 gr of ammonium persulfate and 5 gr of sodium bisulfite were added to the system. Polymerization started about one minute later. When the solution became viscous, the valve at the tank bottom was opened to drop the viscous solution onto a stainless steel belt until the thickness of the solution on the belt became about 16.7 cm. The stainless steel belt was 5 m long and 30 cm wide, equipped with guide plates of 25 cm height on both sides, and a polyester film (Dia foil ®) was laid thereon. Polymerization proceeded, and 20 minutes later, the temperature rised above 100° C. and boiling occurred to release a great volume of water vapor. The boiling state lasted for about 5 minutes, and then the temperature began to drop gradually.

4 hours after start of polymerization, the produced porous polymer gel was discharged by removing the guide plates and driving the steel belt.

This polymer was perfectly soluble in water and its viscosity, measured in the same condition as in Example 1, was 420 cp.

What is claimed is:

1. A method for producing water soluble acrylamide polymers which comprises polymerizing an aqueous solution of acrylamide or mixture of acrylamide and up to 50 mol % based on the total monomer of copolymerizable vinyl monomer in a concentration of 30 to 70% by weight in the presence of polymerization initiator, wherein the heat of polymerization itself causes the polymerization mixture to boil for a brief period during the course of polymerization and wherein said polymerization is initiated at about room temperature, boiling commences from 5 to 20 minutes after initiation and lasts for from 1 to 5 minutes, and the distance from the bottom of the polymerization vessel to the surface of the reaction mixture does not exceed about 500 mm.

2. A method according to claim 1, wherein the monomer is acrylamide.

3. A process according to claim 1, wherein the monomer is a mixture of acrylamide and up to 50 mole % of copolymerizable vinyl monomer.

4. A method according to claim 1, wherein the copolymerizable vinyl monomer is selected from the group consisting of 2-methacryloyloxytrimethylammonium chloride, N,N-dimethylacrylamide, diethylaminoethylmethacrylate and acrylic acid.

5. A porous hydrous gel of acrylamide polymers obtained by the method of claim 1.

* * * * *